E. E. BURKLE.
PROCESS FOR RENDERING LARD AND THE LIKE.
APPLICATION FILED MAR. 26, 1913.
1,124,852.
Patented Jan. 12, 1915.
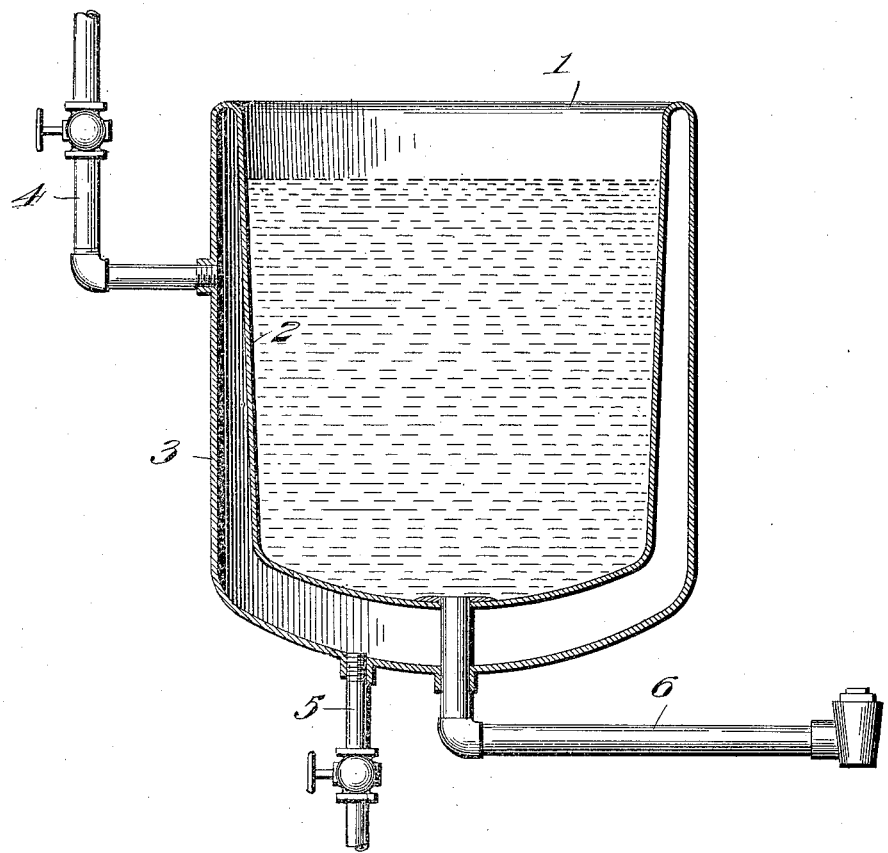
Witnesses
Inventor
Edward E. Burkle
By W. N. Roach, Jr.
Attorney

UNITED STATES PATENT OFFICE.

EDWARD E. BURKLE, OF BRIDGEPORT, OHIO.

PROCESS FOR RENDERING LARD AND THE LIKE.

1,124,852. Specification of Letters Patent. Patented Jan. 12, 1915.

Application filed March 26, 1913. Serial No. 756,962.

*To all whom it may concern:*

Be it known that I, EDWARD E. BURKLE, a citizen of the United States of America, residing at Bridgeport, in the county of Belmont and State of Ohio, have invented certain new and useful Improvements in Processes for Rendering Lard and the like, of which the following is a specification.

This invention relates to a method or process for rendering and refining lard and tallow and the like and to the making and mixing of lard compounds.

The objects of my invention are, to eliminate the necessity of a lard press; to simplify the rendering of lard, using only an open kettle for the process; to produce a lard, pure and free from all unsavory odors.

In carrying out this process a steam jacketed kettle is used, a simple and practical form of which is shown in vertical section in the accompanying drawing.

A steam jacketed kettle 1; provided with an inner shell 2 and an outer shell 3, spaced to allow a steam chamber between the same; has an inlet steam pipe 4 communicating, through the outer shell 3, with the steam chamber and an exhaust pipe 5 communicating, through the lower portion of the outer shell, with the steam chamber. A pipe 6, adapted to empty the kettle of its contents, communicates with the interior of the inner shell at the lowest point thereof.

In making good lard or tallow, the first requisite is that the fat should be clean and fresh. This is especially true with most well known processes and is desirable in this process, though not absolutely essential as the fat may be slightly tainted and still give sweet clean lard and tallow, free from all unpleasant odor and taste. The fat, obtained when butchering, should be placed in clean cool water and allowed to become quite thoroughly cooled therein before placing in the cooler. Before rendering the lard or tallow, the fat from which the same is to be rendered should be put through a cutter or grinder. It is desirable to pour hot water over the fat before grinding as it facilitates the operation.

Put clean cold water to a depth of about six inches in the kettle. Add the fat and for every hundred pounds of fat add a half gallon measure of sal soda. Turn on the steam, which should have a pressure of between forty and sixty pounds. Stir the contents of the kettle well during the heating process and continue to heat until the contents of the kettle begin to foam well and rise in the kettle, then turn off the steam and allow the contents of the kettle to stand about twelve hours, four or five hours will do but the results are not so good. After the contents have stood for about twelve hours, draw off the water, which will have settled at the bottom of the kettle, being careful not to allow any of the lard to escape. This water will be found to have absorbed the impurities of the lard and to have a decidedly bad odor. After the water is drawn off turn on the steam and allow the lard to cook until the cracklings assume a brownish tinge and the lard becomes clear. Never stir the lard during this portion of the operation. When the contents of the kettle assume the characteristics just described, shut off the steam, draw off any water or sediment that may be left in the pipe 6, and allow the lard to run off passing the same through two separate layers of cheese cloth or other suitable filtering means.

It is best to draw the lard directly into a cooler which should be, of preference, provided with a cooling jacket and an agitator. The lard should be agitated in said cooler until it becomes white. Always leave the discharge valve open long enough to thoroughly drain the kettle.

Lard rendered, as hereinbefore described, will have all impurities taken out and will keep for a very long time without becoming rancid. Lard which has become slightly rancid will be found to be sweet and pure if put through this process.

While the foregoing description is for lard and tallow, it will be understood that a combination of lard and tallow may be rendered in the same way in any proportions desired.

If a mixture containing cotton seed oil is desired, the oil should be placed in the cooler and agitated until about the consistency of cream then the lard, or lard and tallow, added. If paraffin is desired to stiffen the lard to which oil has been added, it is best to cut the same up into the kettle and allow it to melt with the lard just before the steam is shut off.

Having described my invention, what I claim as new and desire to secure by Letters Patent, is:—

1. A process of rendering lard and the like consisting in heating the substance to be rendered in an open kettle in contact with water and sal soda, in the proportion of three pounds of sal soda to a hundred pounds of raw fat, allowing the same to cool, removing the water therefrom and reheating the residuum.

2. A process of rendering lard and the like consisting in mincing the substance to be rendered, bringing the same to a boil in one open jacket-kettle in contact with water and sal soda, in the proportion of three pounds of sal soda to a hundred pounds of raw fat, allowing the same to cool, removing the water therefrom and reheating the residuum to drive any remaining water therefrom.

In testimony whereof I hereunto affix my signature in presence of two witnesses.

EDWARD E. BURKLE.

Witnesses:
W. F. KRAUSE,
ROBERT H. CLAYLAND.